E. K. BAKER.
VEHICLE WHEEL.
APPLICATION FILED JULY 7, 1913.
1,159,313.
Patented Nov. 2, 1915.
2 SHEETS—SHEET 1.
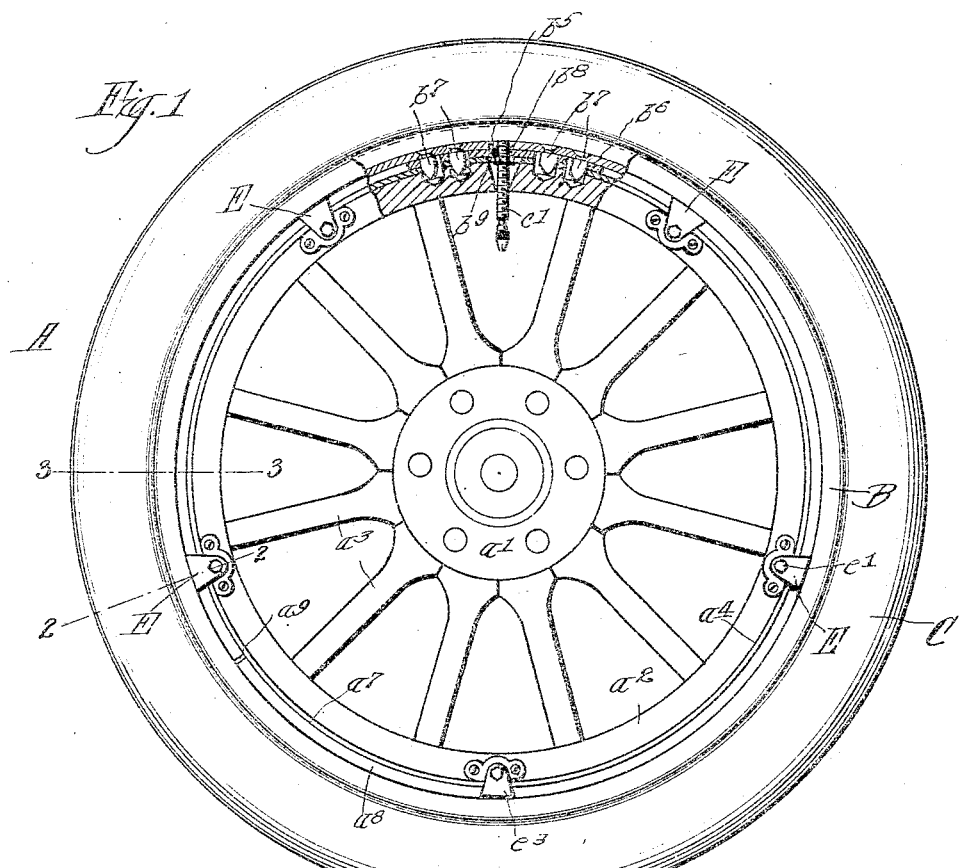
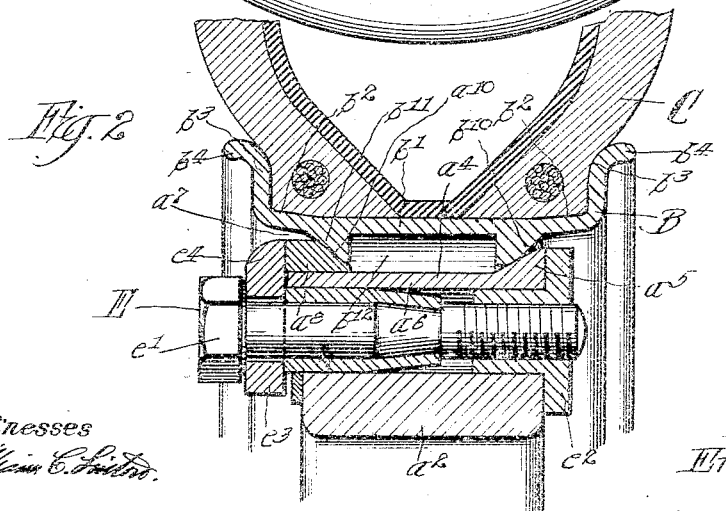
Witnesses
Inventor.
Erle K. Baker.
Attorney.

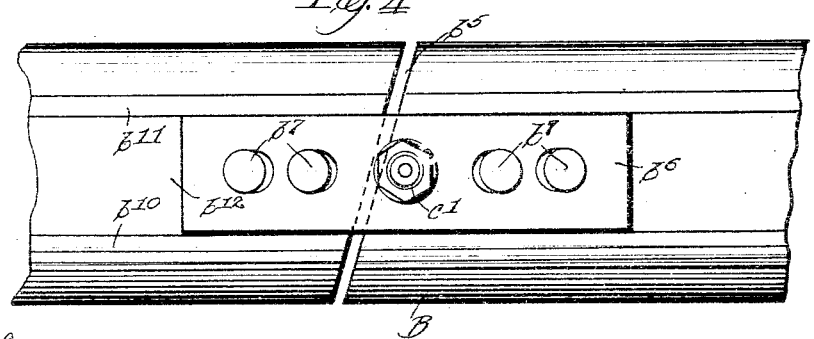
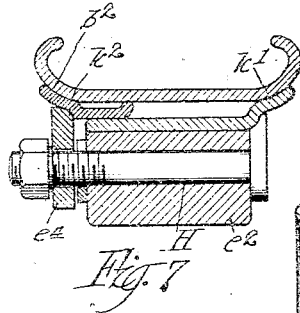
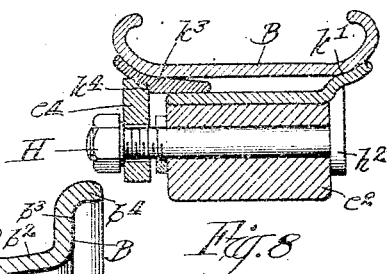
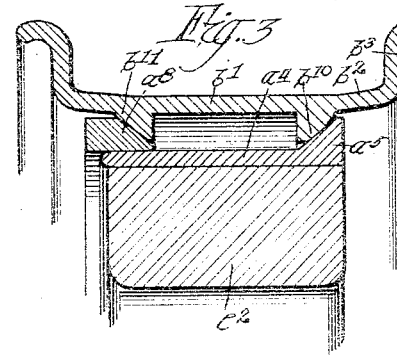
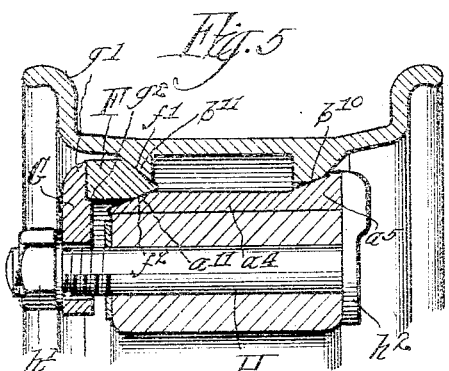
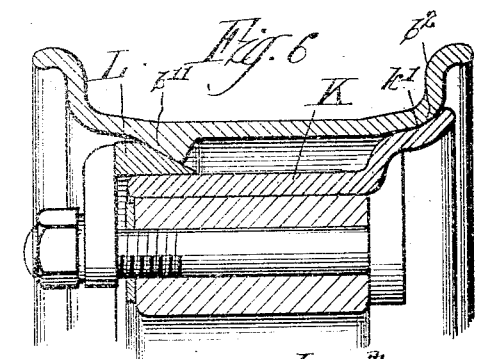

UNITED STATES PATENT OFFICE.

ERLE K. BAKER, OF CHICAGO, ILLINOIS, ASSIGNOR TO UNIVERSAL RIM COMPANY, OF CHICAGO, ILLINOIS, A CORPORATION OF ILLINOIS.

VEHICLE-WHEEL.

1,159,313.  Specification of Letters Patent.  Patented Nov. 2, 1915.

Application filed July 7, 1913. Serial No. 777,696.

*To all whom it may concern:*

Be it known that I, ERLE K. BAKER, a citizen of the United States, and a resident of Chicago, county of Cook, and State of Illinois, have invented certain new and useful Improvements in Vehicle-Wheels, of which the following is a specification.

My invention relates to improvements in vehicle wheels and has special reference to improvements in wheels of the demountable rim type.

The object of my invention is to simplify and cheapen the construction of demountable rims and complementary wheels and to provide a wheel wherein the rim shall be provided with a complete circumferential seat for each side of the rim.

A further object of my invention is to facilitate the mounting and demounting of pneumatic tire rims, and to provide a wheel and rim construction which can be rapidly and cheaply produced by the usual manufacturing facilities.

My invention consists in a demountable one-piece split tire-rim and a complementary wheel, the wheel carrying or provided with a fixed circumferential rim seat at one side, and the rim being held at the opposite side of the wheel by means of a loose wedging split ring adapted to be inserted between the felly of the wheel and the rim, and means for holding the split ring in position.

My invention also consists in a demountable one-piece tire-rim having two spaced wedging circumferential surfaces on its inner periphery and a complementary wheel the wheel having a continuous, rigid wedging rim seat at one side complementary to one of the wedging surfaces of the rim, and a split wedging ring adapted to be inserted between the felly and rim to provide a wedging rim seat at the other side complementary to the other wedging surface of the rim, and means carried by the wheel for holding the split rim in position.

My invention also consists in the several features of construction, and in the combinations and arrangements of parts, whereby the above and other objects are attained, and all as hereinafter described and particularly pointed out in the appended claims.

My invention will be more readily understood by reference to the accompanying drawings, forming part of this specification, and in which:

Figure 1 is a side elevation of a wheel embodying my invention; Fig. 2 is an enlarged transverse section of the wheel on the line 2—2 of Fig. 1; Fig. 3 is a transverse section of the wheel on the line 3—3 of Fig. 1; Fig. 4 is an inner view of the split rim showing the means of tying the ends of the rim together; Fig. 5 is a view similar to Fig. 2 showing a modified form of my invention.

For the purpose of securing demountable rims of some forms upon wheels, it is necessary to provide an annular space between the rim and the wheel for the insertion of suitable wedging or holding devices, and it is one of the particular objects of my invention to provide a rim and a complementary wheel so constructed that this space between the rim and the wheel shall be closed against the entrance of dirt and water, and for the further purpose that the completed wheel may present a more finished appearance.

Many demountable rim constructions have been devised wherein a plurality of relatively short wedging devices are spaced around the felly of the wheel and are adapted to clamp or hold a demountable rim in position on the wheel. In such construction, however, the annular space which receives the wedging devices remains open between the devices, and consequently the space between the rim and the wheel soon fills with mud and presents an unsightly appearance. By means of my invention I eliminate these objectionable features, and I provide a rim and complementary wheel of such construction that the rim is firmly held upon two spaced wedging seats, one at each side of the wheel, the rim contacting substantially throughout its circumference with the rim seats, and thus closing the space between the wheel and the rim, and the wheel therefore presents a completed or finished appearance.

I shall describe my invention as being related to an automobile wheel, composed of a wheel proper A, which comprises a hub $a^1$, of usual form, a felly $a^2$, and spokes $a^3$. The felly is provided with a continuous metallic felly band $a^4$ and this felly band receives and supports a tire rim B which is adapted to receive and hold the tire C.

In the form of my invention illustrated, in Figs. 1 and 2, the tire C is what is known as the "straight side" or "Dunlop" form, and the rim B is formed to receive and hold such a tire, that is, it is provided with a central straight or cylindrical middle portion $b^1$, which merges at each edge into the portions $b^2$ which are inclined outwardly at a slight angle and the rim is provided with integral outwardly extending tire-retaining flanges $b^3$ which terminate at their outer edges in outwardly curved edges $b^4$.

For the purpose of facilitating the mounting and demounting of the tire, I split the rim at one point $b^5$ of its circumference on a diagonal line, as shown in Fig. 4, and I connect the two ends of the rim together by means of a bridge plate $b^6$ which engages with radially projecting pins $b^7$ carried by the rim. I preferably provide the bridge plate and the rim with suitable registering openings $b^8$ and $b^9$ respectively to receive the tire valve $c^1$, and the felly band and felly are also provided with suitable holes for receiving the valve stem. Preferably the pins $b^7$ are long enough to project through suitable openings provided in the felly band and they thereby serve to prevent relative circumferential movement between the rim and the wheel and thereby prevent the bending or distortion of the valve stem. I provide a circumferential wedging or tapered rim seat $a^5$ on the felly band at the rear side of the wheel. This seat extends completely around the wheel and, in the form of my invention illustrated in Figs. 1 and 2, I provide a coöperating circumferential rib or ridge $b^{10}$ on the inner periphery of the rim adapted to contact with the wedging seat $a^5$ on the wheel and thereby support the rear side of the rim. Preferably I provide the forward edge of the rim with a similar tapered rib or ridge $b^{11}$ symmetrically spaced from the rib $b^{10}$ and arranged adjacent to the forward edge of the rim. The spacing of these ribs provides a central channel or groove $b^{12}$ upon the inner periphery of the rim adapted to receive the bridge plate $b^6$. By this construction the plate $b^6$ serves the double purpose of holding the rim against expansion and holding the ends of the rim in alinement. The main portion $a^6$ of the felly band is relatively thin, and an annular space $a^7$ is thereby provided between the body of the rim and the felly band. For the purpose of supporting the forward edge of the rim, I provide a wedging ring $a^8$ which is split or cut apart at one point $a^9$ of its circumference for facilitating its entrance into and removal from its operating position. This wedging ring $a^8$ substantially fits the outer periphery of the felly band and is provided on its inner edge with a wedging seat $a^{10}$ corresponding to the seat $a^5$ at the opposite side of the wheel and adapted to be forced against the wedging rib $b^1$ of the rim and thus hold the rim in position upon the wheel. The wedging ring $a^8$ is adapted to be forced transversely of the wheel and in turn force the rim against the wedging seat $a^5$ and thus produce a tight joint or contact between the rim and the wheel at each side. I force this wedging ring upon the wheel and against the rim by means of a plurality of clamping devices E spaced around the felly of the wheel and each comprising a rotatable bolt $e^1$ and a fixed nut $e^2$. The nut is preferably secured upon the rear part of the felly and the bolt is adapted to be screwed into the nut to clamp the ring in position. Beneath the head of the bolt I mount a rotatable clamp $e^3$ having a projection $e^4$ at one side adapted to extend outwardly and contact with the ring $a^8$, consequently when the bolt is operated to force it into the nut $e^2$ the clamp $e^3$ is forced against the wedging ring $a^8$ and the ring is forced into wedging position between the felly band and the rim. The split in the ring $a^8$ facilitates the entrance and removal of the ring for the reason that the ring is capable of adjusting itself tightly between the felly band and the rim and is thereby capable of contacting closely with each of the members which would not be the case were the ring non-split; in other words, the ring $a^8$ is contractible to fit the felly band, and is expansible to free it from contact therewith when it is desired to remove the ring from its clamping position.

In Fig. 5 I have shown a slight modification of my invention wherein the device is provided with a wedging ring F having two wedging surfaces $f^1$ and $f^2$ on its inner edge. The wedging outer surface $f^1$ is complementary to the wedging rib $b^{11}$ of the rim and is adapted to contact therewith and the inner wedging surface $f^2$ is adapted to co-act with the complementary wedging surface $a^{11}$ provided on the felly band $a^4$, that is, the felly band instead of being cylindrical throughout its periphery, except for the wedging circumferential projection $a^5$, as in the form shown in Fig. 2, is provided on its opposite edge with this wedging surface $a^{11}$ with which the ring F is adapted to coöperate to hold the tire rim in position, otherwise the action of this device is the same as that shown in Fig. 2. In this form of my invention I have shown a modified form of ring clamp G, mounted upon a clamping bolt H. The bolt projects through the felly of the wheel and is provided on its outer end with a clamping nut $h^1$ and on the opposite end with a head $h^2$. The clamp G is mounted upon the body of the bolt beneath the nut and its outer end $g^1$ is adapted to contact with the ring F to hold the ring in its position. The clamp G is provided with a shoulder $g^2$ adapted to contact with the inner periphery of the wedging ring F and the clamp is thereby held against rotation at the time that the nut is being operated to force the ring F between the felly and the rim.

I claim:

1. A transplit demountable rim having, upon its inner periphery, two parallel circumferential ribs, said ribs presenting inner sides which are substantially perpendicular to said periphery, in combination with a rim end connecting member upon and bridging the split in said rim, positioned between and alining the perpendicular walls of said ribs and forming a detachable connection between the ends of the rim.

2. An integrally flanged obliquely transplit, demountable rim having upon its inner periphery two parallel circumferential ribs, said ribs presenting inner sides which are substantially perpendicular to said periphery, in combination with a rim-end-connecting-and-alining member, said member bridging the split in the rim and being positioned between said perpendicular walls of the ribs and forming a detachable connection between the rim ends at said split.

3. An integrally flanged, transplit demountable rim having upon its inner periphery two parallel circumferential ribs, presenting inner sides which are substantially perpendicular to said periphery, in combination with a rim-end-connecting-and-alining member, said member bridging the split in the rim and being positioned between said perpendicular walls of the ribs and forming a detachable connection between the rim ends at said split, and said member and one of said rim ends containing a valve stem opening.

In testimony whereof, I have hereunto set my hand this 27th day of June, 191 , in the presence of two subscribing witnesses.

ERLE K. BAKER.

Witnesses:
JAMES S. DODGE, Jr.,
JOHN R. LEFEVRE.